Feb. 4, 1941. H. C. LACKEY 2,230,408
GASOLINE FILTER
Filed Jan. 6, 1940
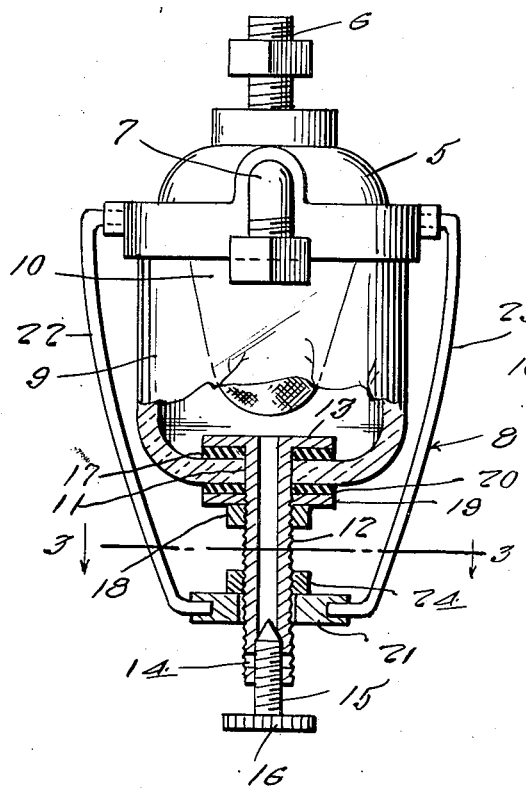
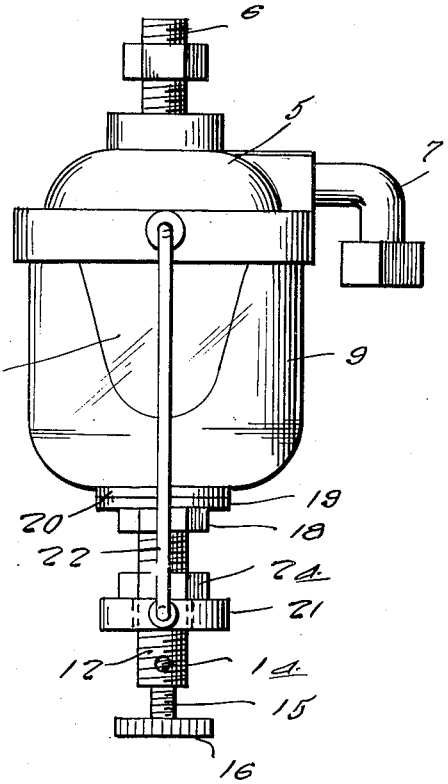
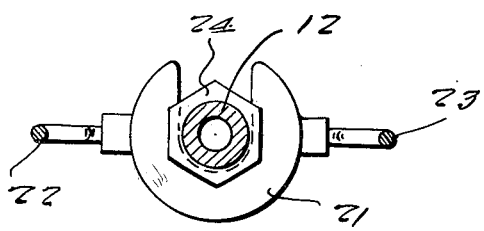
Inventor
H. C. Lackey
By Clarence A. O'Brien
and Hyman Berman
Attorneys Patented Feb. 4, 1941

2,230,408

UNITED STATES PATENT OFFICE 2,230,408

GASOLINE FILTER

Howard Charlie Lackey, Littlefield, Tex.

Application January 6, 1940, Serial No. 312,777

2 Claims. (Cl. 210—165)

The present invention relates to new and useful improvements in gasoline filters more particularly the type of gasoline filter having a removable sediment bowl, and has for its primary object to provide a device of this character whereby the sediment or other foreign matter collected therein may be readily drained therefrom.

Another object of the invention is to provide a gasoline filter wherein foreign matter may be drained therefrom without the heretofore necessity of removing the sediment bowl.

Other objects of the invention are to provide a device of the aforementioned character which will be strong and reliable in use and which may be manufactured at low cost.

Still further objects and advantages of the invention will become apparent from a study of the following detailed description, taken in connection with the accompanying drawing, wherein like characters of reference designate corresponding parts throughout the several views, and wherein:

Figure 1 is a side elevational view of my invention.

Figure 2 is a side elevational view of the invention with parts broken away and shown in cross section.

Figure 3 is a transverse sectional view taken substantially on the line 3—3 of Figure 2.

Referring now to the drawing, in detail, it will be seen that the reference numeral 5 designates a cover having an inlet tube 6 and outlet tube 7, and to which is pivotally secured the yoke 8 which is adapted to support the bowl 9.

Housed within the bowl 9 and secured to the cover 5 is the usual filter element 10.

The bowl 9 is constructed of glass, or other suitable material, and has an opening 11 formed in its bottom side in which is mounted a threaded drain tube 12.

The drain tube 12 extends from the bowl 9 and has its flanged end 13 within the bowl 9 while its other end is internally threaded and has a needle valve 15 mounted therein for controlling the flow from the bowl 9 through the openings 14. Valve 15 is equipped with a head 16 to facilitate adjustment of the valve.

The threaded drain tube 12 extends through the bottom of the bowl 9 with its flange 13 within the bowl 9. A suitable resilient washer 17 located between the bowl 9 and the flange 13 to prevent leakage is compressed by a nut 18 which is mounted on the drain tube 12 below the bowl 9 and forces the metal washer 19 and the flange 13 to compress the resilient washers 17 and 20 against the inside and outside of the bowl 9.

The yoke 8 holds the bowl 9 securely to the cover 5 and is constructed to provide a substantially crescent shaped plate 21 which has arms 22 and 23 fixed thereto which are swingably secured to the cover 5. The crescent shaped plate 21 is adapted to straddle the threaded drain tube 12 and be forced longitudinally thereof by a nut 24 which is mounted on the threaded drain tube 12.

As can readily be seen, when it is desired to drain sediment from the bowl 9 the valve 15 is manipulated to permit the contents of the bowl to drain through the openings 14. If for any reason the bowl 9 must be removed, the nut 24 is manipulated to release the crescent shaped plate 21 which can then be swung away from the tubular drain 12 and permit the bowl 9 to separate from the cover 5.

Although I have shown and described herein a preferred embodiment of my invention, it is to be definitely understood that I do not desire to limit the application of the invention thereto, and any change or changes may be made in the materials and in the structure and arrangement of the parts, within the spirit of the invention as claimed.

What is claimed is:

1. In a gasoline filter, a filter bowl, a cover therefor, a yoke straddling the bowl and pivoted to the cover, said yoke at the bight thereof being provided with a notch, said bowl having a depending drain tube seated in said notch, and means engaging said tube and bight of the yoke to secure the parts in assembled position.

2. In a gasoline filter, a filter bowl, a cover for the bowl, a yoke straddling the bowl and pivotally secured to the cover, said yoke at the bight thereof being provided with a notch, a threaded drain tube extending from said bowl and engaged in said notch and a nut on said threaded tube engageable with said bight of the yoke to releasably secure the parts in assembled position.

HOWARD CHARLIE LACKEY.